(12) United States Patent
Warnock

(10) Patent No.: US 10,929,499 B2
(45) Date of Patent: Feb. 23, 2021

(54) SYSTEM FOR LOADING SOFTWARE MODULES

(71) Applicant: Eeosk, Inc., Oakland, CA (US)

(72) Inventor: Tyler R. Warnock, Oakland, CA (US)

(73) Assignee: Eeosk, Inc., Oakland, CA (US)

( * ) Notice: Subject to any disclaimer, the term of this patent is extended or adjusted under 35 U.S.C. 154(b) by 0 days.

(21) Appl. No.: 16/412,367

(22) Filed: May 14, 2019

(65) Prior Publication Data

US 2019/0354561 A1 Nov. 21, 2019

Related U.S. Application Data

(60) Provisional application No. 62/671,870, filed on May 15, 2018.

(51) Int. Cl.

| | |
|---|---|
| *G06F 17/00* | (2019.01) |
| *G06F 16/958* | (2019.01) |
| *G06F 9/451* | (2018.01) |
| *G06F 9/445* | (2018.01) |
| *H04L 29/08* | (2006.01) |
| *G06F 40/14* | (2020.01) |
| *G06F 40/117* | (2020.01) |
| *H04L 29/06* | (2006.01) |

(52) U.S. Cl.
CPC .......... *G06F 16/958* (2019.01); *G06F 9/445* (2013.01); *G06F 9/451* (2018.02); *G06F 40/117* (2020.01); *G06F 40/14* (2020.01); *H04L 67/02* (2013.01); *H04L 67/2819* (2013.01); *H04L 67/42* (2013.01)

(58) Field of Classification Search
CPC ...... G06F 16/958; G06F 40/117; G06F 40/14; H04L 67/02
See application file for complete search history.

(56) References Cited

U.S. PATENT DOCUMENTS

| | | | |
|---|---|---|---|
| 2013/0046855 A1* | 2/2013 | Jiang ................. | H04L 67/02 709/218 |
| 2013/0339841 A1 | 12/2013 | Petti | |
| 2014/0053059 A1 | 2/2014 | Weber et al. | |
| 2016/0012147 A1 | 1/2016 | Benjamin | |
| 2016/0182672 A1* | 6/2016 | Kuperman ............ | H04L 67/02 709/213 |

OTHER PUBLICATIONS

International Search Report and Written Opinion, PCT Application No. PCT/US2019/032512, dated Jul. 25, 2019, 15 pages.

* cited by examiner

*Primary Examiner* — Scott T Baderman
*Assistant Examiner* — Barbara M Level
(74) *Attorney, Agent, or Firm* — Fenwick & West LLP

(57) ABSTRACT

A client executes a resource such as a webpage or software application including modules that are received based on information about the resource. The resource includes tags that can be replaced by modules specific to the resource. To decrease the time it takes to prepare a resource for execution, the client requests a set of modules known to be previously requested for the resource. The client can replace the tags with the modules from the requested set of modules, without needing to first parse the resource to determine which tags are in the resource and require associated modules.

17 Claims, 3 Drawing Sheets

SYSTEM FOR LOADING SOFTWARE MODULES

CROSS-REFERENCE TO RELATED APPLICATIONS

This application claims a benefit of U.S. Provisional Application No. 62/671,870, filed May 15, 2018, which is incorporated herein by reference in its entirety.

BACKGROUND

The disclosure relates generally to loading modules of a resource for execution at a client, and in particular, to incorporating additional software modules of a resource for generating a user interface display by executing the resource.

Capturing and retaining a user's attention can be difficult due to short attention spans and competing content. Including content and effects in a display, such as a webpage, can lead to an increase in the time it takes a display to load and it can be beneficial for a system to be able to access content and effects for a display quickly.

A system typically needs to carry out several tasks to prepare for displaying a web page. The system requests a resource, such as an HTML document, that describes the content, format, and styling of the web page. This request is usually made to a remote web server that hosts the web page. When the system receives the resource from the web server, it parses the entire resource. The parsing step may include searching the resource to determine whether additional documents, data, or information need to be retrieved to properly display the web page in the manner described by the resource. For example, the system may search the resource for a set of tags that are included in the resource as placeholders for additional text or additional software modules that may not have been included with the HTML document when the system received the document from the web server. After parsing the resource and requesting the additionally required modules from the web server or from another server, the system can load the modules into the resource and execute the resource, for example, by rendering the web page.

This process includes several steps that can lead to delays in the display of the web page. First, there can be a delay involved in requesting the resource from a web server, as web servers can take varying amounts of time to process requests. In addition to the delay associated with requesting the resource, there is a delay inherent in parsing the resource for tags, as well as additional delays in requesting software modules to replace the tags from a server, waiting for the server to search for and respond with the correct modules, and loading the modules into the appropriate locations of the resource.

SUMMARY

A client system loads a page or other type of content presentation format by parsing a resource that contains instructions for how the client should execute the resource, for example, to display a web page. The resource may include information about the content, appearance, behavior, and effects that should appear when the client renders the page. For example, a resource may be an HTML document that describes the content and appearance of a web page. After requesting and receiving the resource from a web server, the client system accesses the resource and begins parsing the resource to display the page. However, unlike in a typical system, which must take time to parse through the entire resource to identify tags in the resource, the client identifies a directive at the beginning of the resource and executes a script included in the directive prior to parsing the rest of the resource. The directive is a script that is executed by the system to request additional text or software modules that augment the resource. In some embodiments, a script may be a different format of instructions for execution by the client 110, for example, a directive may be bytecode. The directive includes a resource identifier that allows a server to which the client is making the request to identify a set of modules that are associated with the resource, and that the server accordingly sends to the client for inclusion in the resource. A resource identifier may be a domain or path to the resource, or another identification value that the server uses to label stored sets of modules that are associated with the resources. In some cases, this could also allow the server to store or cache different sets of modules for subdomains of a resource, or for individual users of a resource.

If the server has any stored modules that are identified for inclusion in the resource when requested with the resource identifier, it provides the modules to the client system. Thus, the client can receive modules to replace tags in the resource before the client has parsed the entire resource or even determined which tags are included in the resource. Additionally, since the set of modules for the particular resource are cached together and identified as a group by the resource identifier, the server can select a set of modules to send to the client without searching for individual modules to match each of a set of tags. Instead, the client system replaces the placeholder tags in the resource with the associated modules that it received from the server responsive to the request with the resource identifier.

This process reduces the time required for preparing to display a web page in several ways. The server does not spend extra time searching for a module that can be associated with each tag in the resource, and the client can parse the resource at the same time as the request for modules associated with the resource is being processed by the server. Furthermore, when the client receives the set of cached modules from the server, it can begin replacing the tags in the resource with the available modules immediately upon parsing the resource instead of sending requests for associated modules for the tags.

In some cases the set of cached modules received by the client includes all modules that are needed to replace the tags in the resource. However, in some cases, the client system identifies placeholder tags in the resource that did not receive an associated module. For example, this may occur if tags have been added to the resource since the last time the module cache associated with the resource was updated at the server. Accordingly, the client system may request modules for the specific remaining placeholder tags from the server. The server can identify the modules that should be associated with the remaining tags, and sends those requested modules to the client system. The client system can replace the remaining placeholder tags with the received modules and display the page to the user. Although this second step for requesting additional modules may occasionally add a delay to the process of executing the resource, the server storing the cached modules can also update the module cache associated with the provided resource identifier to include the newly requested modules. Thus, anytime the module cache associated with that resource identifier is accessed by any client system, the second step will not be required and the page can load more quickly because the modules will be readily available.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high level block diagram of a system environment, in accordance with an example embodiment.

Figure 1:
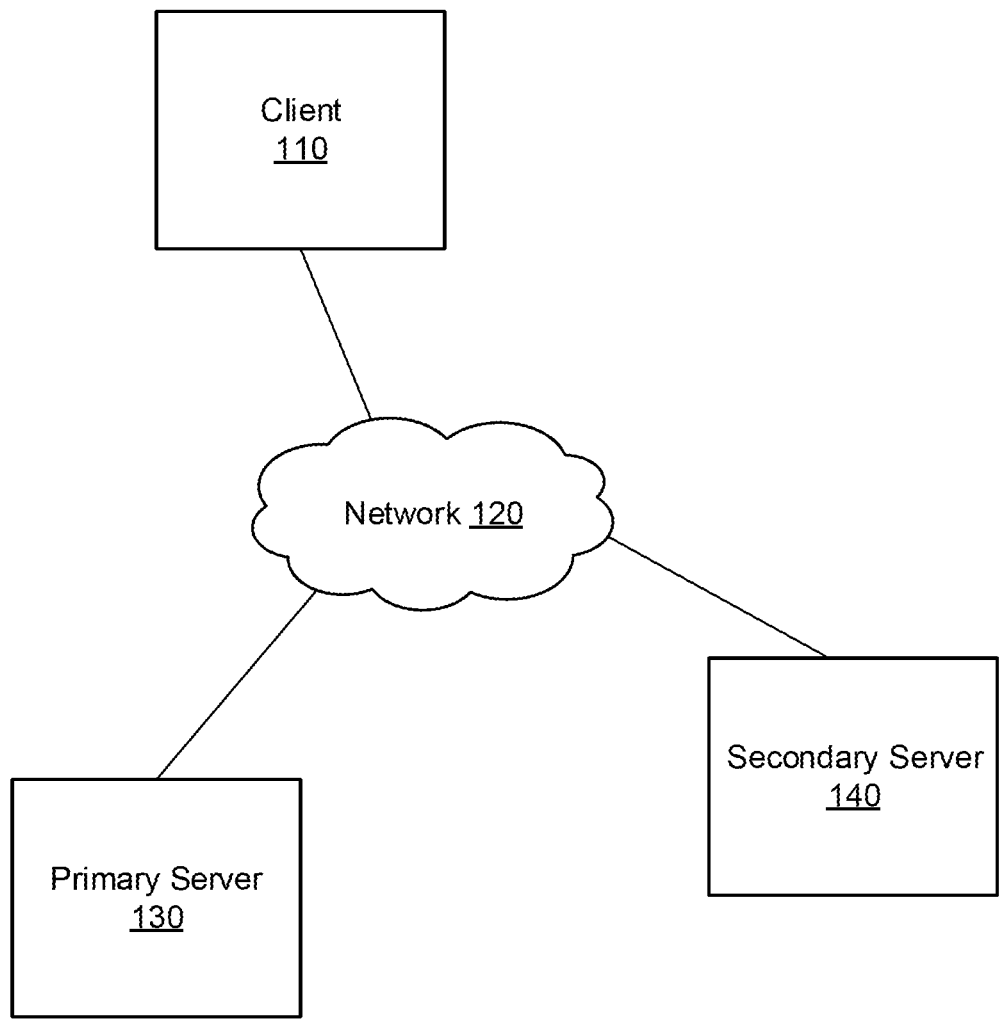

A letter after a reference numeral, such as "105A," indicates that the text refers specifically to the element having that particular reference numeral, while a reference numeral in the text without a following letter, such as "105," refers to any or all of the elements in the figures bearing that reference numeral.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A client presents content to users according to a set of rules included in a resource. A resource is a document or body of software intended to be interpreted by a computing device such as a computer, tablet, or phone. For example the resource may include instructions for formatting, style, effects, and content that will be presented in a webpage when the computing device interprets or executes the resource. The resource may be replicated across multiple computing devices and may exist in multiple copies on the same device. One example of a resource is a hypertext markup language (HTML) document that a client can execute to display a web page in a browser.

A resource may be identified with a resource identifier, that is, any identifier that is used to reference or otherwise locate the resource. Examples of resource identifiers include uniform resource locators (URLs), identification values, names, numbers, or aliases. A resource identifier is used to identify modules stored at a server that are associated with the resource. In particular, a server can store caches or sets of modules that are all associated with a resource identifier. For example, a resource identifier may be a portion of the URL of a webpage and the server may store a module cache of modules to be sent to the client whenever it requests a set of modules and provides the portion of the URL of the webpage as the resource identifier.

The resource may include directives, tags, and modules. A directive is a portion of software that instructs a computing device to perform an operation. In some embodiments, a directive may be a script, or a piece of code. One example of a directive is a script written in a scripting language. A tag is a portion of text or software that acts as a placeholder into which other text or software will be inserted. A module is a portion of software that can be inserted into the location occupied by a tag in the resource. A tag may include an identifier that matches it to a particular module (e.g., "module-abc"), or a tag may be matched to a module based on criteria such as the tag's location within the resource or the tag's order relative to other tags in the resource. After the module is inserted in place of the associated tag, the module may be activated or otherwise processed. This system allows for dynamic selection of modules since the resource document specifies where, not what goes in place of a tag. For example, the module associated with a tag can be changed at the server and the resource can stay the same, but will incorporate the new module when it replaces the tags with modules. In some embodiments, modules may be stored and transmitted in module caches, where a module cache is a text or software based representation of a set of modules, and the representation of the set of modules is stored in a location from which it can be retrieved without any information about the particular modules which it represents. In particular, a module cache stores sets of modules that are associated with a particular resource identifier. Thus, when the client requests modules and sends the resource identifier, the server can quickly locate the module cache associated with the resource identifier and send the set of modules to the client independent of which modules are in the set. The module caches also make it possible for the modules associated with a resource identifier to be updated at the server, without any changes being made to the resource itself. For example, a system administrator at the server storing the modules may change the modules in a module cache associated with a resource identifier, such as by replacing a module with a module that will have a different effect on the webpage that is loaded when the module is included in the resource and the resource is executed.

The client communicates with one or more servers to obtain modules in a resource while it processes the resource. The client replaces the tags in the resource with the received modules and uses the modules as it executes the resource.

FIG. 1 is a high level block diagram of a system environment, in accordance with an example embodiment. FIG. 1 includes a client 110, a network 120, a primary server 130, and a secondary server 140. For clarity, only one client 110, one primary server 130, and one secondary server 140 are shown in FIG. 1. Alternate embodiments of the system environment can have any number of clients 110, as well as multiple primary servers 130 and secondary servers 140. The functions performed by the various entities in FIG. 1 may vary in different embodiments.

A user may access a webpage, user interface, application, or other content distribution format via a client 110. A client 110 can be a computing device such as a computer, tablet, smartphone, notebook computer, or other device that is capable of interpreting at least one of a resource, a module, or a module cache. For example, a client 110 may be a computer with which a user uses a browser to access a webpage.

The primary server 130 is a computing device that is capable of sending a resource to another computing device. One example of a primary server is a web server which can respond to requests for a webpage by sending resources such as scripts, hypertext markup language (HTML) documents, and other formatting and content documents to a client for display to a user.

The secondary server 140 is a computing device that is capable of sending a module or a module cache to another computing device, such as a client. The secondary server stores modules that can be associated with tags and sent to a client 110 in response to a request for a module to replace a given tag. In some embodiments, the secondary server 140 stores module caches associated with specific resource identifiers. A client 110 can request a module cache associated with a resource identifier from the secondary server 140 and receive a set of modules that are likely to be associated with the tags in the current version of the resource without having to first spend computing time and computing resources determining what tags are included in the resource. A module cache is a set of modules that are associated with a particular resource identifier. This allows the secondary server 140 to access a set of modules and provide them to the client 110 without the secondary server 140 needing information about tags that the modules match with.

In one embodiment, the secondary server 140 adds modules to a module cache for a particular resource whenever a client 110 requests a module for that resource and the module is not already in the module cache for the resource. In this embodiment, the set of modules acting as a cache for that resource identifier may be updated such that any client 110 that provides the resource identifier will get the modules that have been needed by a client for that resource identifier in the past. In alternate embodiments, a system administrator or other user may have the ability to access and modify module caches stored at the secondary server 140. For example, if a website administrator wants to make changes to the modules that are accessed when a client 110 requests modules for a particular resource, the website administrator might amend a list of modules in a module cache for that resource as stored on the secondary server 140. When a client 110 subsequently requests a module cache for the resource, the secondary server 140 can supply the client 110 with the required modules without needing to search for modules associated with specific tags in the resource.

A client 110 may communicate with a primary server 130 and a secondary server 140 via the network 120. The network 120 may comprise any combination of local area and wide area networks employing wired or wireless communication links. In some embodiments, all or some of the communication on the network 120 may be encrypted.

Figure 2A:
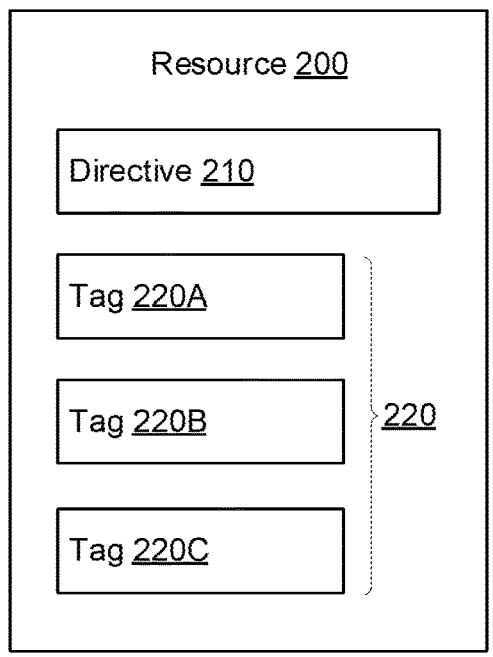
FIG. 2A is a schematic representation of a resource 200, in accordance with an embodiment

FIG. 2A is a schematic representation of a resource 200, in accordance with an embodiment. The resource 200 includes a directive 210 and tags 220. In one embodiment, the resource 200 is structured such that the directive 210 is parsed or interpreted before the first tag 220A is parsed or interpreted when the client 110 executes the resource 200.

The directive 210 may be a script that directs the client 110 to send a request to the secondary server 140. In one embodiment, the directive 210 is executed while the client continues to parse and execute the rest of the resource 200. The directive 210 may include or generate a resource identifier that may be included in a request to the secondary server 140 indicating which modules or which module cache to send to the client 110. In one embodiment, the resource identifier is a document identifier, or a path to the resource, e.g., a URL or portion of a URL. In some embodiments, the resource identifier may include additional identification information that allows the resource 200 to be assigned module caches more selectively. For example, a resource identifier that includes only a domain for a webpage, would cause the directive 210 to request the same modules for all tags 220 in the webpage. By contrast, a resource identifier that includes a domain and a path would cause the directive 210 to request modules for tags specifically at the domain and path. As another example, a resource identifier may include additional variables, such as may be obtained by parameters in the URL or from stored cookies, that indicate a particular user or group of users are accessing the webpage. In this case, the directive 210 may include a resource identifier that can be used to request a module cache that has been saved for that user or group of users.

A tag 220 includes information that allows the tag to be associated with a module. For example, a tag 220 may be defined by a module identifier value. In one embodiment, the secondary server 140 stores multiple modules or multiple versions of a module that can replace a tag with a particular module identifier. In such a case, the secondary server 140 may respond to a request for a module with a module or module cache that is associated with the particular module identifier and the provided resource identifier. In another embodiment, the secondary server 140 may respond to a request for a module with a module or module cache based on a set of criteria separate from the module identifier defined in a tag 220. For example, the secondary server 140 may include a module intended to replace a tag 220 based on the tag's location or order within the resource 200.

Figure 2B:
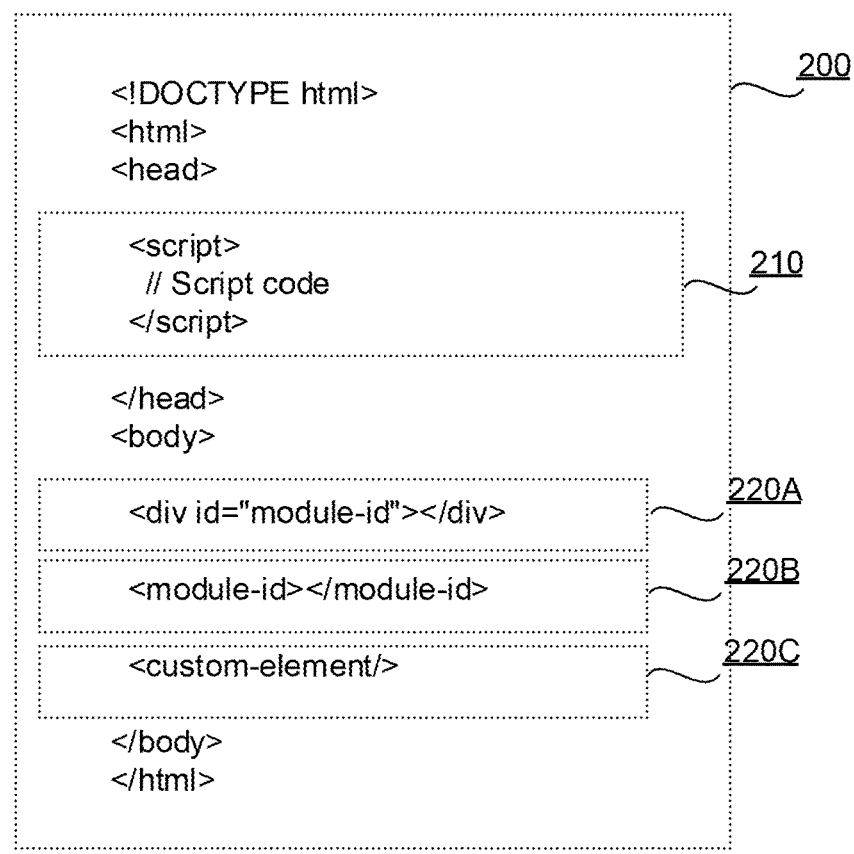
FIG. 2B is a pseudocode representation of a resource written in HTML, in accordance with one example embodiment.

FIG. 2B is a pseudocode representation of a resource written in HTML, in accordance with one example embodiment. The example resource 200 of FIG. 2B is an HTML document. The head of the resource includes a directive 210 in the form of a script. In alternate embodiments, the directive 210 may be included in other portions of the resource 200, such as in the body of an HTML document, however, it is beneficial for the directive to be included near the beginning of the order of execution of the resource 200 so that the cached modules may be requested from the secondary server 140 as the rest of the resource 200 is interpreted or parsed by the client 110. The example resource 200 of FIG. 2B also includes example tags 220A, 220B, and 220C. For example, the tag 220B has a module-id label, so it can be replaced with a module that is associated with the "module-id" tag and with the resource identifier for the resource 200. In the example of FIG. 2B, both tag 220A and tag 220 B would be replaced with the same module since they include "module-id" values to indicate that they are associated with the same module. This is an example of how there can be multiple ways to indicate that a particular module is to be used in a particular location within a resource. In this case, two copies of the module (associated with both tag 220A and tag 220B) would be included in the resource.

In some embodiments, not all tags 220 have a specific identifier associating the tag with a particular module. Even if this is the case, a tag 220 can be associated with a module. For example, the tag 220C of FIG. 2B is a custom-element tag 220. In one embodiment, a custom-element tag 220 may be matched to a default module by the secondary server 140. For example, the module cache stored at the secondary server 140 and associated with the resource identifier for the resource 200 may include a chosen module or set of modules to be used in the case that no other specific module identifier is included in a tag 220 in the resource 200. A chosen module for a resource 200 may be set by an administrator who has access to change the contents of a module cache for the resource 200 at the secondary server 140. In another embodiment, the secondary server 140 may also include chosen modules that can be supplied to replace a tag 220 that does not have an assigned module in the module cache associated with its resource 200.

Figure 3:
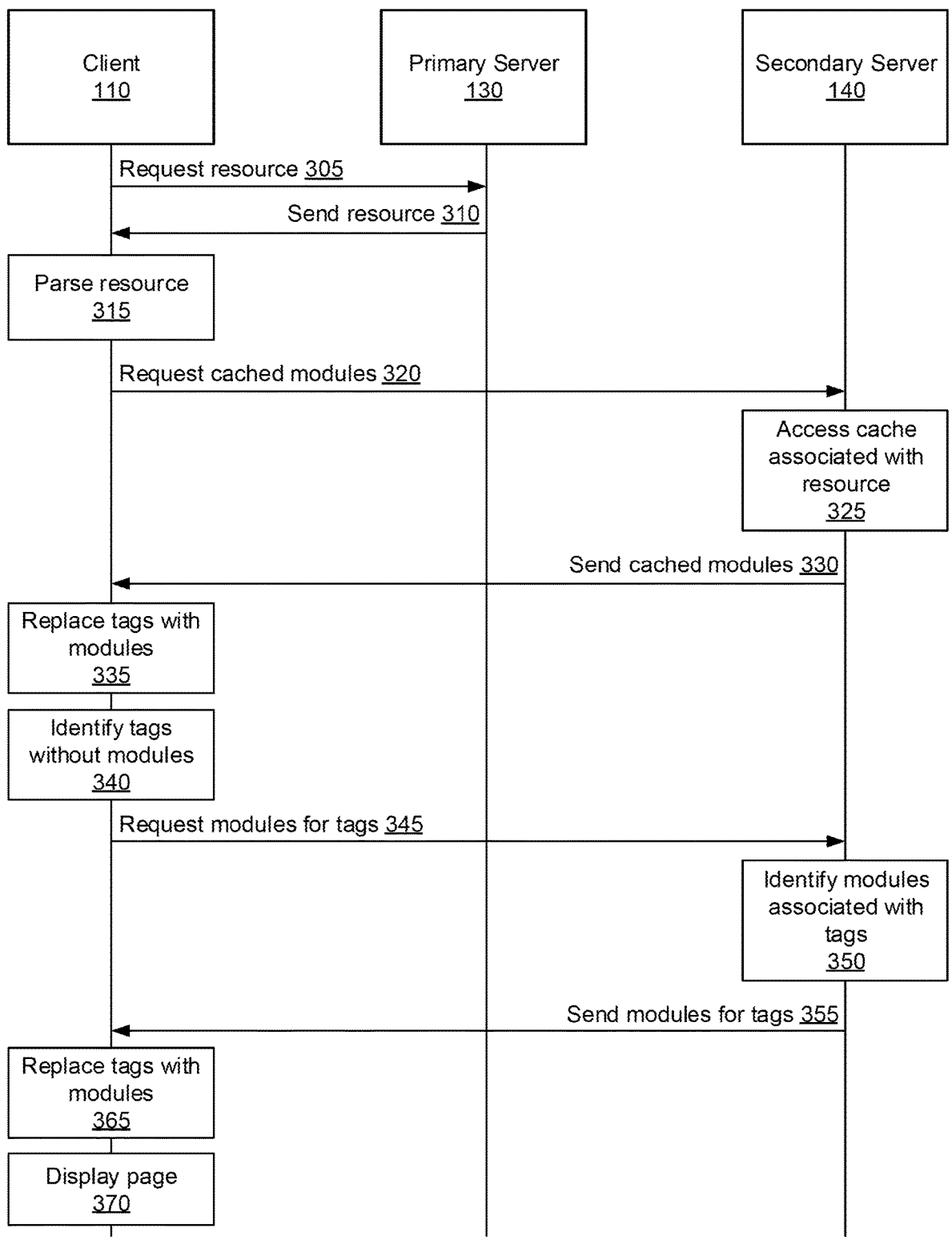
FIG. 3 is a sequence diagram illustrating a process of replacing tags 220 with modules in a resource 200, in accordance with an example embodiment.

FIG. 3 is a sequence diagram illustrating a process of replacing tags 220 with modules in a resource 200, in accordance with an example embodiment. The client 110 requests 305 a resource 200 from a primary server 130, such as a webserver. The primary server 130 sends 310 the resource to the client 110. The client 110 parses 315 the resource 200. While parsing the resource 200, when the client 110 parses a directive 210, the client 110 executes the directive 210 to request 320 cached modules 320 from the secondary server 140. The request for cached modules includes a resource identifier that the secondary server 140 can use to search for the module cache that is associated with the resource 200. The secondary server 140 receives the request 320 for the cached modules and accesses 325 the cache associated with the resource 200 that is specified by the resource identifier. The secondary server 140 sends 330 the accessed cached modules 330 to the client 110. The client 110 replaces 335 the tags 220 in the resource with modules from the received set of cached modules.

The client 110 also identifies 340 tags 220 that have not been replaced with modules because no modules associated with those tags 220 were received in the module cache sent by the secondary server 140. The client 110 requests 345 modules for the remaining tags 220. The secondary server 140 receives the request and identifies 350 modules associated with the tags 220, for which the client 110 has requested modules and sends 355 the modules for the tags to the client 110. The client 110 replaces 365 the remaining tags 220 with modules and displays 370 the page (or otherwise executes the resource 200).

In cases for which the module cache received from the secondary server 140 includes all the necessary modules for replacing all the tags 220 in the resource 200, the client 110 does not need to send a second request 345 to the secondary server 140. Thus the initial request for cached modules associated with a resource 200 can save computing time and computing resources because the client 110 can quickly replace all tags 220 with appropriate modules and execute the resource 200 to display a page without having to first parse for all tags 200 and request modules for each tag 220 found in the resource 200.

In one embodiment, the client 110 utilizes a resource 200 comprising a directive 210 and one or more tags 220. The resource is processed by the client 110 at which point the directive 210 instructs the client 110 to initiate a request to the secondary server 140. The request comprises a resource identifier that allows the secondary server 140 to return a response with one or more modules or a module cache. The request may be initiated before the client 110 has fully parsed or interpreted the tags 220 contained in the resource 200. In some embodiments, the resource identifier included in the directive 210 sent to the secondary server 140 may be a different value than an identifier that may be used by the client 110 to request the resource 200 from a primary server 130. For example, the client 110 may send a URL to a primary server 130 to request a resource 200, then the resource identifier sent to the secondary server 140 with the request for modules could be derived from the URL. For example, the resource identifier sent to the secondary server 140 could be a base64 encoded combination of a domain and path associated with the resource 200.

It is possible to use a network 120 such as the Internet or an intranet to facilitate this system. One possible configuration is for the client 110 to send a request comprising a resource identifier to a primary server 130 which then sends a response to the client 110 comprising the resource 200. Upon receipt of the resource 200, the client is able to initiate the request. Another possible configuration is for the client 110 to store and process the resource 200 locally and to initiate a request to the secondary server 140 when a predetermined condition is met. For example, the client 110 may initiate the request as part of: executing a different script other than the directive 210, as a response to a user action, or after some amount of time has passed.

One implementation of the system includes hosting the secondary server 140 as an Internet or intranet connected software application. This implementation includes providing a system that sequentially allows the client 110 to initiate, before the client 110 has fully parsed or interpreted the tags 220 contained in the resource 100, a request to the secondary server 140 comprising a resource identifier. The client 110 can then continue processing the resource 200 while the request is made. The secondary server 140 returns a response comprising modules or a module cache to the client 110. The response may finish before or after the client 110 has interpreted the tags 220 contained in the resource 200. The client processes the response to perform operations including, but not limited to: replacing the tags 220 with modules from the response, using the tags 220 to determine where the modules should be placed in the resource, and causing the client 110 to load, fetch, download, request, or otherwise implement any software dependencies as are indicated as necessary by the response or the modules. Examples of additional dependencies that may be indicated as necessary include stylesheets, and additional scripts or software libraries that need to be loaded before the module can execute.

In one implementation, the system further includes the ability for the resource to be an HTML document. In this implementation, the request made by the client 110 to the secondary server 140 can be made before the client 110 has begun to parse any HTML tags contained in the <body> tag of the HTML document. This can be accomplished by locating the directive 210 within the <head> tag of the HTML document or by locating or denoting the directive 210 in some other way such that it is processed before the tags 220 are processed in the resource 200.

In one embodiment, the system further includes the ability for the directive 210 to instruct the client 110 to, upon initiating a request to the secondary server 140 and having received a response, wait until the tags 220 in the resource have been processed by the client 110 before performing operations such as replacing the tags 220 with modules or loading additional software dependencies.

In one embodiment, the system further includes the ability for the client 110, as instructed by the directive 210, to begin performing operations such as replacing tags 220 with modules or loading additional software dependencies once the client 110 has received a response from the secondary server 140, regardless of whether the client 110 has fully processed the tags 220 in the resource 200. In this implementation, it may be possible for the client 110 to begin performing operations upon receipt of the response from the secondary server 140 without having determined which tags 220 are in the resource 200. Some examples of operations that the client 110 might perform include: altering the resource based on a prediction of what it includes, initiating one or more additional requests to the secondary server 140 or another server related to the received modules or module cache, and processing, parsing, optimizing, compiling, transpiling, or otherwise operating on the modules. Transpilation refers to compilation between two higher-order languages, as opposed to compilation from a higher-order language to a lower-order language.

In one embodiment, the client 110 can further initiate an additional request to create a module cache. This may occur, for example, in the event that no modules or module cache are returned from the secondary server 140 in an initial response. In this implementation, the client 110 may receive a response from the secondary server 140 indicating that no modules or module cache are currently associated with the resource identifier. Upon receiving this response and after determining which tags 220 are contained in the resource 200, the client may initiate a request including the information required for the secondary server 140 to create a module cache associated with the resource identifier. Whenever the resource 200 is processed by a client 110 in the future, the client 110 will receive the appropriate modules in the initial response from the secondary server 140.

In one embodiment, the system further includes the ability for the client 110 to initiate any additional requests as are needed to add one or more modules to a module cache in the event that the modules or module cache returned in the initial response from the secondary server 140 do not include all modules to correspond to the tags 220 in the resource 200. In this implementation, the client 110 receives a response from the secondary server 140 indicating one or more modules or a module cache currently associated with the resource 200. Upon receiving the response and after determining that one or more additional tags 220 of the tags 220 in the resource 200 do not have a corresponding module from the modules or the module cache, the client 110 initiates a request including information required to add the matching modules or modules to a module cache that is associated with the resource identifier for the resource 200. Then, whenever the resource 200 is processed by the same client 110 or by another client 110 in the future, the client will receive the appropriate modules or module cache in the initial response from the secondary server 140.

One embodiment of the system further includes the ability for the system associated with the secondary server 140 to make updates to any modules caches whenever any module which corresponds to or is included in the module caches is updated. Such updates can occur independently of any client 110 activity. Any module caches delivered by the secondary server 140 can thus remain up to date independently of the resource 200 or any clients 110.

In one embodiment, the secondary server 140 can delete, remove, empty, or otherwise invalidate a module cache independently of changes at the resource 200, client 110, or any of the modules associated with the module cache. In this manner, a module cache may be reset whenever it is desired.

In one embodiment, the system further includes the ability for the resource 200 to include one or more tags 220 which are not associated with any particular module. Such tags indicate that they are to be associated with a module, but do not indicate which module in particular. In this implementation, the modules or module cache sent by the secondary server 140 is made to contain one or more modules intended for association with those tags which are not explicitly associated with any particular module. In this implementation, it is possible to reuse a resource 200 in whole or in part by giving it different resource identifiers for each use. This allows for different modules or module caches to be delivered to an otherwise similar resource 200, for example, when a different resource identifier is used. In this implementation, it is also possible to change which module or modules correspond to tags 220 found in the resource 200 without altering the resource 200. This can be done independently of any clients 110 if desired, or can be done as a result of further client 110 interaction with the secondary server 140, or any other server. In this manner, modules can be swapped, added, or removed from a module cache for use with a resource 200 independently of the resource 200 or any directive 210 or tags 220 that the resource may contain.

In one embodiment, the system further includes the ability for the client 110, after receiving the initial response from the secondary server 140, to later send a request to the secondary server 140 or any other server indicating that the modules or module cache should be updated to include, exclude, update, or otherwise alter one or more modules contained in the module or module cache. In this implementation, it is possible for an asynchronous operation, such as a user action, delayed command, alteration of the resource 200, or any other operation to initiate an update to the modules or module cache based on the conditions present at a time after the initial response is received from the secondary server 140. In this manner, the modules or module cache can be updated based on the assumption that future clients may also undergo the asynchronous operation, thus preparing the overall system in advance.

In one embodiment, the system includes the ability for modules to undergo pre-processing before inclusion in a module cache. The pre-processing may include compilation, transpilation, compression, obfuscation, combination, or another operation. In this implementation, a module cache may be an improved or otherwise optimized representation of the modules it stores or references.

In one embodiment, the system includes the ability for the client 110 to insert HTML into the resource 200 as part of the processing of the modules or module cache received from the secondary server 140. In this implementation, portions of the resource 200, including but not limited to the tags 220 can be altered, appended to, or replaced to facilitate the processing of the modules or module cache.

In one embodiment, the system includes the ability for the client 110 to insert CSS or other HTML <style> tags into the resource 200 as a part of the processing of the modules or module cache received from the secondary server 140. In this implementation, portions of the resource 200 can be altered, appended to, or replaced to facilitate the processing of the modules or the module cache.

In one embodiment, the system further includes the ability for the client 110 to insert, parse, evaluate, or otherwise process script codes contained in the modules or module cache received from the secondary server 140. In this implementation, the code can be processed by the client 110 in the context of the resource 200. In this manner, the code can be used to add additional functionality to the resource 200 in conjunction with, or separately from, the modules or module cache. This additional functionality can apply to the context of the entire resource 200 or can apply to a more narrow context within the resource 200, including to a module or tag 220 within the resource 200.

In one embodiment, the client 110 may, based on the response received from the secondary server 140, initiate further requests to the primary server 130, the secondary server 140, or another server. The client 110 may alter the resource 200 such that the client 110 is instructed to initiate further requests to the primary server 130, the secondary server 140, or another server, the client 110 may reference, refresh, reload, or reprocess any previously loaded software, or the client may alter the resource 200 such that the client 110 is instructed to reference, refresh, reload, or reprocess any previously loaded software.

In one embodiment the system further includes the ability for the client 110 to insert, parse, evaluate, or otherwise process bytecode contained in the modules or module cache received from the secondary server 140. In this implementation, the code can be processed by the client 110 in the context of the resource 200. In this manner, the code can be used to add additional functionality to the resource 200 in conjunction with, or separately from, the modules or module cache. This additional functionality can apply to the context of the entire resource 200 or can apply to a more narrow context within the resource 200, including a module or tag 220 within the resource 200.

One embodiment further includes the ability of the system to be a part of a larger module editing system in which modules can be edited independently of the resource 200, client 110, primary server 130, or secondary server 140. In this implementation, an editing tool is made available such that users of the system can create, read, update, or delete modules or portions of modules as needed. Changes made by the editing tool are propagated through the system such that any secondary servers 140 have the most recent modules or module cache available to deliver to clients 110. An example of this implementation is an editing tool made available as an Internet or intranet service. Users of the service can make changes to one or more modules via an Internet or intranet connection, independently of whether the users have access to any resources 200 associated with the modules. The changes are propagated by the system such that they are reflected in the modules or module cache on one or more secondary servers 140.

In one embodiment, the system can be made available as an Internet or intranet based service. The service can include: the ability to control which module or modules corresponds to a given tag 220; the ability to control which resource identifiers correspond to a given module or module cache; the ability to control which module or modules correspond to a tag 220 in the event that the tag does not include information associating it with a specific module; the ability to associate a tag 220 with a specific module based on the resource identifier used, independently of whether the tag 220 contains information liking it to the module; the ability to restrict which resource identifiers can be used in association with a given module or module cache; the ability to report which modules, module caches, or tags 220 are associated with a give resource identifier; the ability to create, edit, update, delete, or otherwise alter a module; the ability to create, edit, update, delete or otherwise alter a module cache; the ability for a user to control which other users have access to various operations or information on the service; the ability to accept payment from users; or the ability for administrators of the service to restrict one or more features from a particular user based on the user's authorization, payment status, behavior or other criteria.

In another embodiment, the system further includes the ability to restrict or alter the response from the secondary server 140 based on whether or not the resource identifier meets a set of criteria. In this implementation, certain resource identifiers can be allowed without alteration, while other resource identifiers can cause the secondary server 140 to not send a response or to send an alternate response. For example, the alternate response could be an altered, filtered or expanded set of modules or an altered module cache, the alternate response could be a response indicating that the resource identifier is invalid, or the alternate response could be a response that is faster or slower than an otherwise equivalent response.

In another embodiment, the system utilizes a client 110 to initiate a request to a secondary server 140 with the request comprising a resource identifier that allows the secondary server 140 to return a response with one or more modules or module cache. The request is initiated as part of the processing of a resource 200 in which it encounters a directive other than the directive 210, with the resource 200 containing one or more tags 220 and optionally containing a directive 210. In this embodiment of the system, the client can process the resource before, after, or simultaneously with the request and the client can do this processing independently of the presence or absence of a directive 210. For example, the client may request modules for a resource in response to a directive 210 from a different resource, or from another script.

In another embodiment, the client 110 may initiate a module request to the secondary server 140 to obtain the modules or module cache in conjunction with a resource request to the primary server 130 to obtain the resource 200. The module request to secondary server 140 can be initiated before, after, or simultaneously with the resource request to primary server 130. Furthermore, the module request may utilize a resource identifier which is the same as, different from, or related to the resource identifier utilized by the resource request.

Another configuration is for the client 110 to store and process one or more resources directly and to initiate a request as described above whenever a predetermined condition is met.

In one embodiment, the secondary server 140 is hosted as an internet or intranet connected software application. This implementation includes providing a system that allows the client 110 to initiate a request to the secondary server 140 comprising a resource identifier, where the request is initiated independently of whether the client 110 has parsed or interpreted a resource. This implementation includes providing a system that allows the client 110 to initiate a request to the secondary server 140 comprising the resource identifier, the secondary server 140 to return a response comprising modules or a module cache to the client 110, and allows the client to process the response to perform operations. The operations may include altering the resource 200 by replacing one or more of its tags 220 with modules contained in the response, utilizing the tags 220 to determine where the modules should be placed, causing the client 110 to load, fetch, download, request, or otherwise implement any software dependencies as indicated by the response or modules.

In one embodiment, the system includes the ability for the client 110 to initiate an additional request to create a module cache in the event that no modules or module cache are returned from the secondary server 140 in the initial response. In this implementation, the client 110 receives a response from the secondary server 140 indicating that no modules or module cache are currently associated with the resource identifier. Upon receiving this response and after determining which tags 220 are contained in the resource 200, the client 110 initiates a request comprising the information required to create a module cache associated with the resource identifier, with the request being made to the secondary server 140 or any other server capable of handling the request. In this manner, whenever the resource identifier is sent to a secondary server 140 in the future, the secondary server will respond with the appropriate modules or module cache in the initial response.

In one embodiment, the system further includes the ability for the client 110 to initiate any requests as needed to add one or more modules to a module cache in the event that the modules or module cache received from the initial response of the secondary server 140 do not contain all modules corresponding to the tags 220 located in the resource 200. In this implementation, the client 110 receives a response from the secondary server 140 indicating one or more modules or module cache currently associated with the resource 200. Upon receiving the response and after determining that one or more additional tags 220 within the tags 220 do not have a corresponding module from the modules or module cache, the client 110 initiates a request comprising the information required to add the module or modules to a module cache associated with the resource identifier, with the request being made to the secondary server 140 or any other server capable of handling the request. In this manner, whenever the resource is processed by a client 110 in the future, the client will receive the appropriate modules or module cache in the initial response from a secondary server 140.

One embodiment includes the ability for the system associated with the secondary server 140 to make updates to any module caches whenever any module is updated which corresponds to or is contained by the module caches. The updates can happen independently of any client activity 110. In this manner, any module caches delivered by the secondary server 140 will remain up to date independently of the resource 200 or client 110.

One embodiment further includes the ability for the system associated with the secondary server 140 to delete, remove, empty, or otherwise invalidate a module cache independently of the resource 200, client 110, or any of the modules associated with the module cache. In this manner, a module cache may be reset whenever it is desirable.

One embodiment includes the ability for the resource 200 to include one or more tags 220 which are not associated with any particular module. The tags 220 indicate that they are to be associated with a module but do not indicate which module in particular. In this implementation, the modules or module cache sent by the secondary server 140 is made to contain one or more modules intended for association with those tags 220 which are not explicitly associated with any particular module. In this implementation, it is possible to reuse a resource, in whole or in part, by giving it different resource identifiers for each use. This allows for different modules or module caches to be delivered to an otherwise similar resource, for example, when a different resource identifier is used. In this implementation, it is also possible to change which module or modules correspond to a tag or tags 220 found in the resource 200 without altering the resource 200. This can be done independently of any clients if desired, or can be done as a result of further client 110 interaction with the secondary server 140 or any other server. In this manner, modules can be swapped, added, or removed from a module cache for use with a resource 200 independently of the resource or any directive 210 or tags 220 the resource may contain.

One embodiment includes the ability for the client 110, after receiving the initial response from the secondary server 140 to later send a request to the secondary server 140 indicating that the modules or module cache should be updated to include, exclude, update, or otherwise alter one or more modules contained in the modules or module cache. In this implementation, it is possible for an asynchronous operation, such as a user action, delayed command, alteration of the resource 200, or any other operation, to initiate an update to the modules or module cache based on the assumption that future clients may also undergo the asynchronous operation, thus preparing the overall system in advance.

One embodiment further includes the ability for modules to undergo pre-processing before inclusion in a module cache, such as compilation, translation, error checking, type checking, automated testing, malware testing, optimization, compression, obfuscation, combination, or another operation.

One embodiment includes the ability for the client 110 to insert HTML into the resource 200 as part of the processing of the modules or module cache received from the secondary server 140. In this implementation, portions of the resource 200 including the tags 220 can be altered, appended to, or replaced to facilitate the processing of the modules or modules cache.

One embodiment includes the ability for the client 110 to insert CSS or HTML <style> tags into the resource 200 as part of the processing of the modules or module cache received from the secondary server 140. In this implementation, portions of the resource 200 can be altered, appended to, or replaced to facilitate the processing of the modules or module cache.

In one embodiment, the system further includes the ability for the client 110 to insert, parse, evaluate, or otherwise process script codes contained in the modules or module cache received from the secondary server 140. In this implementation, the code can be processed by the client 110 in the context of the resource 200. In this manner, the code can be used to add additional functionality to the resource 200 in conjunction with, or separately from, the modules or module cache. This additional functionality can apply to the context of the entire resource 200 or can apply to a narrower context within the resource 200, including to a module or tag 220 within the resource 200.

In one embodiment, the client 110 may, based on the response received from the secondary server 140, initiate further requests to the primary server 130, the secondary server 140, or another server, the client 110 may alter the resource 200 such that the client 110 is instructed to initiate further requests to the primary server 130, the secondary server 140, or another server, the client 110 may reference, refresh, reload, or reprocess any previously loaded software, or the client may alter the resource 200 such that the client 110 is instructed to reference, refresh, reload, or reprocess any preciously loaded software.

In one embodiment, the system further includes the ability for the client 110 to insert, parse, evaluate, or otherwise process bytecode contained in the modules or module cache received from the secondary server 140. In this implementation, the code can be processed by the client 110 in the context of the resource 200. In this manner, the code can be used to add additional functionality to the resource 200 in conjunction with, or separately from, the modules or module cache. This additional functionality can apply to the context of the entire resource 200 or can apply to a narrower context within the resource 200, including a module or tag 220 within the resource 200.

One embodiment further includes the ability of the system to be a part of a larger module editing system in which modules can be edited independently of the resource 200, client 110, primary server 130, or secondary server 140. In this implementation, an editing tool is made available such that users of the system can create, read, update, or delete modules or portions of modules as needed. Changes made by the editing tool are propagated through the system such that any secondary servers 140 have the most recent modules or module cache available to deliver to clients 110. An example of this implementation is an editing tool made available as an Internet or intranet service. Users of the service can make changes to one or more modules via an Internet or intranet connection, independently of whether the users have access to any resources 200 associated with the modules. The changes are propagated by the system such that they are reflected in the modules or module cache on one or more secondary servers 140.

One embodiment includes the ability for the client 110 to include a web browser. In this implementation, a web browser installed on the client 110 contains software that allows the client 110 to initiate a request to a secondary server 140 independently of any resources 200 on the client and any requests the client 110 may make to a primary server 130 to obtain the resources 200. In this manner, it is possible for the client 110 to optimize its web browser experience by initiating a request to a secondary server 140 whenever it is optimal to do so, rather than relying on the contents of a give resource 200.

In one possible embodiment, the system can be made available as an Internet or intranet based service. The service can include the ability to control which module or modules corresponds to a given tag 220, the ability to control which resource identifiers correspond to a given module or module cache, the ability to control which module or modules correspond to a tag 220 in the event that the tag does not include information associating it with a specific module, the ability to associate a tag 220 with a specific module based on the resource identifier used, independently of whether the tag 220 contains information liking it to the module, the ability to restrict which resource identifiers can be used in association with a given module or module cache, the ability to report which modules, module caches, or tags 220 are associated with a give resource identifier, the ability to create, edit, update, delete, or otherwise alter a module, the ability to create, edit, update, delete or otherwise alter a module cache, the ability for a user to control which other users have access to various operations or information on the service, the ability to accept payment from users, or the ability for administrators of the service to restrict one or more features from a particular user based on the user's authorization, payment status, behavior or other criteria.

In one embodiment, the system further includes the ability to restrict or alter the response from the secondary server 140 based on whether or not the resource identifier meets a set of criteria. In this implementation, certain resource identifiers can be allowed without alteration, while other resource identifiers can cause the secondary server 140 to not send a response or to send an alternate response. For example, the alternate response could be an altered, filtered or expanded set of modules or an altered module cache, the alternate response could be a response indicating that the resource identifier is invalid, or the alternate response could be a response that is faster or slower than an otherwise equivalent response.

What is claimed is:

1. A computer-implemented method comprising:
    executing a script included in a directive portion of a resource, wherein executing the script includes sending a resource identifier that identifies the resource to a server and requesting a set of one or more modules associated with the resource identifier from the server, wherein the request for a set of one or more modules associated with the resource does not identify specific modules;
    receiving the set of modules associated with the resource identifier that identifies the resource from the server, wherein each module from the set of modules is a portion of software that can be inserted into the resource;
    subsequent to execution of the script included in the directive, identifying a set of tags included in the resource, wherein each tag from the set of tags is a portion of the resource that acts as a placeholder for a module and wherein each tag includes a module identifier that associates the tag to a particular module;
    for each tag of the set of tags identified in the resource:
        determining whether the module identifier included in the tag associates the tag to one of the modules in the set of modules received from the server; and
        replacing the tag with the associated module; and
    generating a user interface based on the resource.

2. The computer-implemented method of claim 1, further comprising:
    determining a second set of tags in the resource that have module identifiers that do not associate the tags with any of the modules from the received set of modules;
    requesting, from the server, modules associated with the tags in the determined second set of tags, the request including the module identifiers associated with the tags in the second set of tags;
    receiving a second set of modules from the server, the second set of modules including an associated module for each of the tags in the determined second set of tags; and
    for each tag in the determined second set of tags:
        determining the module from the second set of modules that is associated with the tag; and
        replacing the tag with the associated module from the second set of modules.

3. The computer-implemented method of claim 1, wherein the resource is a document that can be interpreted by a computer processor to render a user interface for display on a client device.

4. The computer-implemented method of claim 1, wherein the resource is an HTML document.

5. The computer-implemented method of claim 1, wherein the received set of modules is a set of cached modules that have been previously requested by a system using the resource.

6. The computer-implemented method of claim 1, further comprising:
    obtaining dependencies required by the modules to be added to the resource in addition to the modules.

7. The computer-implemented method of claim 1, wherein generating a user interface based on the resource comprises displaying a webpage wherein the display includes executing directives included in the modules of the resource.

8. A non-transitory computer-readable storage medium storing computer program instructions that when executed by one or more processors of a system, cause the one or more processors to perform steps comprising:
    executing a script included in a directive portion of a resource, wherein executing the script includes sending a resource identifier that identifies the resource to a server and requesting a set of one or more modules associated with the resource identifier from the server, wherein the request for a set of one or more modules associated with the resource does not identify specific modules;
    receiving the set of modules associated with the resource identifier that identifies the resource from the server, wherein each module from the set of modules is a portion of software that can be inserted into the resource;
    subsequent to execution of the script included in the directive, identifying a set of tags included in the resource, wherein each tag from the set of tags is a portion of the resource that acts as a placeholder for a module and wherein each tag includes a module identifier that associates the tag to a particular module;

for each tag of the set of tags identified in the resource:
determining whether the module identifier included in the tag associates the tag to one of the modules in the set of modules received from the server; and
replacing the tag with the associated module; and generating a user interface based on the resource.

9. The non-transitory computer-readable storage medium of claim 8, the steps further comprising:
determining a second set of tags in the resource that have module identifiers that do not associate the tags with any of the modules from the received set of modules;
requesting, from the server, modules associated with the tags in the determined second set of tags, the request including the module identifiers associated with the tags in the second set of tags;
receiving a second set of modules from the server, the second set of modules including an associated module for each of the tags in the determined second set of tags; and
for each tag in the determined second set of tags:
determining the module from the second set of modules that is associated with the tag; and
replacing the tag with the associated module from the second set of modules.

10. The non-transitory computer-readable storage medium of claim 8, wherein the resource is a document that can be interpreted by a computer processor to render a user interface for display on a client device.

11. The non-transitory computer-readable storage medium of claim 8, wherein the resource is an HTML document.

12. The non-transitory computer-readable storage medium of claim 8, wherein the received set of modules is a set of cached modules that have been previously requested by a system using the resource.

13. The non-transitory computer-readable storage medium of claim 8, wherein generating a user interface based on the resource comprises displaying a webpage wherein the display includes executing directives included in the modules of the resource.

14. A computer system comprising:
one or more computer processors for executing computer program instructions; and
a non-transitory computer-readable storage medium storing instructions that when executed by the one or more computer processors, cause the one or more processors to perform steps comprising:
executing a script included in a directive portion of a resource, wherein executing the script includes sending a resource identifier that identifies the resource to a server and requesting a set of one or more modules associated with the resource identifier from the server, wherein the request for a set of one or more modules associated with the resource does not identify specific modules;
receiving the set of modules associated with the resource identifier that identifies the resource from the server, wherein each module from the set of modules is a portion of software that can be inserted into the resource;
subsequent to execution of the script included in the directive, identifying a set of tags included in the resource, wherein each tag from the set of tags is a portion of the resource that acts as a placeholder for a module and wherein each tag includes a module identifier that associates the tag to a particular module;
for each tag of the set of tags identified in the resource:
determining whether the module identifier included in the tag associates the tag to one of the modules in the set of modules received from the server; and
replacing the tag with the associated module; and
generating a user interface based on the resource.

15. The computer system of claim 14, the steps further comprising:
determining a second set of tags in the resource that have module identifiers that do not associate the tags with any of the modules from the received set of modules;
requesting, from the server, modules associated with the tags in the determined second set of tags, the request including the module identifiers associated with the tags in the second set of tags;
receiving a second set of modules from the server, the second set of modules including an associated module for each of the tags in the determined second set of tags; and
for each tag in the determined set of tags:
determining the module from the second set of modules that is associated with the tag; and
replacing the tag with the associated module from the second set of modules.

16. The computer system of claim 14, wherein the resource is a document that can be interpreted by a computer processor to render a user interface for display on a client device.

17. The computer system of claim 14, wherein the received set of modules is a set of cached modules that have been previously requested by a system using the resource.

* * * * *